United States Patent
Isometsä et al.

(10) Patent No.: US 6,592,503 B2
(45) Date of Patent: Jul. 15, 2003

(54) ROLL THAT CAN BE BENT WITH A COMPOSITE SHELL

(75) Inventors: Juha Isometsä, Jyväskylä (FI); Tuomo Kurkela, Haukipudas (FI); Jorma Snellman, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 197 days.

(21) Appl. No.: 09/803,459

(22) Filed: Mar. 9, 2001

(65) Prior Publication Data

US 2001/0023224 A1 Sep. 20, 2001

(30) Foreign Application Priority Data

Mar. 16, 2000 (FI) .............................. 20000619

(51) Int. Cl.[7] .............................................. B29C 43/46
(52) U.S. Cl. ................. 492/7; 492/45; 492/47
(58) Field of Search .............................. 492/2, 6, 7, 20, 492/45, 47, 16, 60; 100/172, 170, 155 R; 310/90

(56) References Cited

U.S. PATENT DOCUMENTS

| | | | | |
|---|---|---|---|---|
| 2,960,749 A | * | 11/1960 | Robertson et al. | ............ 492/20 |
| 3,094,771 A | * | 6/1963 | Robertson | ...................... 492/7 |
| 3,168,435 A | * | 2/1965 | Beachler | ...................... 162/348 |
| 3,438,100 A | | 4/1969 | Moore | |
| 3,604,087 A | * | 9/1971 | Beck | .............................. 492/6 |
| 3,672,018 A | * | 6/1972 | Junk et al. | ...................... 492/7 |
| 3,731,357 A | * | 5/1973 | Shirai | ............................. 492/2 |
| 4,470,183 A | | 9/1984 | Kuosa | |
| 5,061,533 A | | 10/1991 | Gomi et al. | |

FOREIGN PATENT DOCUMENTS

| | | |
|---|---|---|
| WO | 99/09329 WO | 2/1999 |
| WO | WO 00/32869 | 6/2000 |

* cited by examiner

Primary Examiner—Gregory Vidovich
Assistant Examiner—T. Nguyen
(74) Attorney, Agent, or Firm—Lathrop & Clark LLP

(57) ABSTRACT

A roll has a continuous tubular roll shell (11) of a composite material and axle journals (12) rotating together with the roll shell and joined to each end of the roll shell. The axle journals are supported on a supporting element (13) surrounding the axle journal (12) by at least two bearing elements (14, 15) located at a distance from each other in the axial direction (X—X) of the roll, which supporting element (13) for its part is supported on the machine frame structures (R). The first bearing element (14, 15) is supported on the supporting element (13) through a bending mechanism (20, 21), which is used for applying to the first bearing element (14, 15) a force affecting in a radial direction in order to deflect the first bearing element (14, 15) in relation to the central axis (X—X) of the unbent roll, whereby the axle journal (12) will bend in relation to a pivot point which is formed at the second bearing element (14, 15) and a bending moment is applied to the roll shell (11).

14 Claims, 2 Drawing Sheets

ROLL THAT CAN BE BENT WITH A COMPOSITE SHELL

CROSS REFERENCES TO RELATED APPLICATIONS

This application claims priority on Finnish Application No. 20000619, Filed Mar. 16, 2000, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention concerns a roll provided with a continuous tubular shell of a composite material. Due to the advantageous characteristics of the material of a composite roll, such as elastic modulus and density, the composite roll can be dimensioned so that it may be bent into the desired curvature by a moderate moment and so that it will function either at a sub-critical speed, that is, below the lowest resonance frequency, or in between resonance frequencies. If it is desired to bend a steel roll into the required curvature without bringing about excessive tensions, the roll diameter must be very small. Hereby one or more critical roll speeds must unavoidably be exceeded.

With a steel roll, the bending moment needed for bending is also considerably higher than with a composite roll, whereby the bearing forces of the steel roll are also considerably higher than with a composite roll.

The applicant's WO Publication 99/09329 presents a roll that can be bent for a web-like material. The roll includes a continuous tubular roll shell of a composite material as well as axle journals connected to either end of the roll shell. The axle journals are attached with at least one support point to a mounting flange structure mounted to the machine frame. In addition, the roll includes a bending mechanism, which is used for bending the axle journals and that way the roll shell into the shape of an arc, and a control device, which is used for controlling the angular position of the roll arc.

The solution according to the invention forms a simple alternative in relation to the solutions presented in the applicant's above-mentioned WO publication.

SUMMARY OF THE INVENTION

In the roll according to the invention there is a continuous tubular roll shell of a composite material. At both ends of the roll shell there are axle journals rotating together with the roll shell. The axle journals are supported on a supporting element surrounding the axle journal by at least two bearing elements located at a distance from each other in the roll axis direction. The supporting element again is supported on to the machine frame structures through one support point. The first bearing element is supported on to the supporting element through a bending mechanism, by which the first bearing element can be moved in the radial direction as a pivot point is formed at the second bearing element, whereby a bending moment is applied to the roll shell. Thus, the roll structure is quite simple and it needs little maintenance. Owing to its simple structure, the roll is easy to manufacture and its costs are advantageous. In addition, the simple structure facilitates maintenance of the roll.

The roll according to the invention may be used e.g. as a spreader roll in a paper or board machine.

In the following, the invention will be described with reference to the figures shown in the appended drawings, but the intention is not to restrict the invention solely to the details of these figures.

Further objects, features and advantages of the invention will be apparent from the following detailed description when taken in conjunction with the accompanying drawings.

DESCRIPTION OF THE PREFERRED EMBODIMENTS

Figure 1:
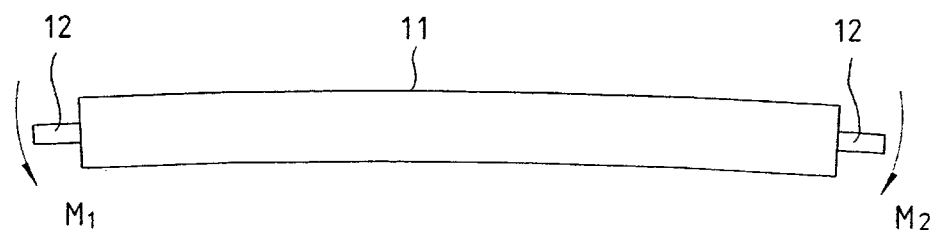
FIG. 1 is a schematic basic view, wherein a continuous tubular roll shell is bent by a moment applied to both ends of the roll shell.

FIG. 1 is a basic view showing a roll provided with a shell 11 of a composite material and provided with axle journals 12. By applying bending moments $M_1$, $M_2$ to the axle journals 12 located at the roll ends, the roll shell 11 can be bent into the desired curvature. Moment $M_1$ may be different from moment $M_2$, whereby the progress of the web proceeding on the roll shell 11 may be directed in the roll axis direction.

Figure 2:
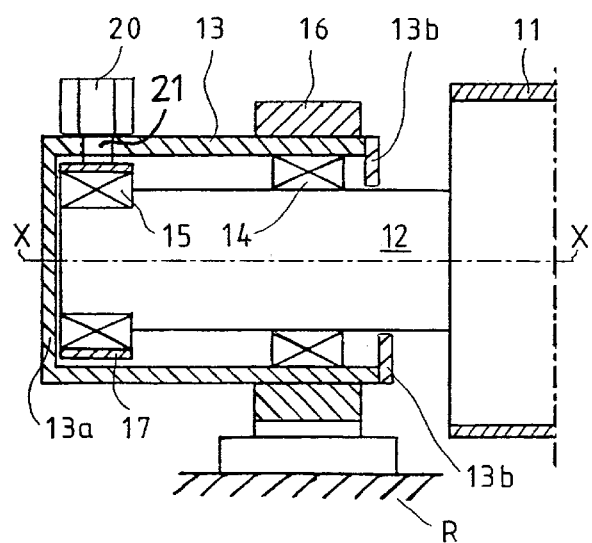
FIG. 2 is a schematic longitudinal cross-sectional view of one end face area of the roll according to the invention.

FIG. 2 shows an embodiment of the roll according to the invention. The figure is a schematic longitudinal section of one end face area of the roll. The roll consists of a continuous tubular roll shell 11 of a composite material, at each end face of which axle journals 12 are fitted, which rotate together with the shell 11 and protrude from the end face of the shell 11. Each axle journal 12 is pivoted rotatingly by bearings 14, 15 located at a distance from each other in the direction X—X of the roll axis. An essentially tubular supporting element 13 is fitted around the axle journal 12. The bearing 14 located innermost in relation to the end face of the roll shell 11 is supported at its inner periphery on the axle journal 12 and at its outer periphery on the inner surface of the supporting element 13. The bearing 15 located outermost in relation to the roll shell 11 is supported at its inner periphery on the narrowed outer end of the axle journal 12 and at its outer periphery on a bending mechanism 20, 21 fitted into the supporting element 13 through a supporting ring 17. The supporting element 13 is supported at its outer periphery at the inner bearing 14 on a mounting flange 16, which for its part is mounted to the machine frame structures R. Outside the axle journal 12 on the machine maintenance side, the outer end face of the supporting element 13 is closed by an outer end face wall 13a. On the driving side of the machine, a roll driving shaft can be placed through the outer end face wall 13a. At the inner end face of supporting element 13 there is an inner end face wall 13b, which has an opening equal in size to the cross-section of the axle journal 12 and which can be sealed to the axle journal 12. Between the end face walls 13a, 13b the shape of the supporting element 13 is essentially cylindrical. The end face walls 13a, 13b can be used for closing the inner space of the supporting element 13.

The bending mechanism 20, 21 here consists of a pin 21, which is mounted to a supporting ring 17 surrounding the outer periphery of the outer bearing 15 and which is provided with an external thread and extends through the supporting element 13 and a nut 20 fitted to the pin 21 outside the supporting element 13. Using the nut 20 supported against the outer surface of the supporting element 13, a force in the radial direction can be applied to the outer bearing 15, by which force the outer bearing 15 is deflected in relation to the central axis X—X of the unbent roll, whereby the inner bearing 14 functions as the pivoting point. Thus, such a bearing 14 must be used here, which allows both rotating of the axle journal 12 and the pivoting motion required for bending. Instead of one bearing 14 it is possible to use two concentric superimposed bearings, whereby the inner bearing is the rotatory bearing, whereas the outer bearing is the pivot bearing. By using a screw element to apply the desired bending moments to the axle journals 12 located at both ends of the roll shell 11, the roll shell 11 is made to bend into the desired curvature.

Figure 3:
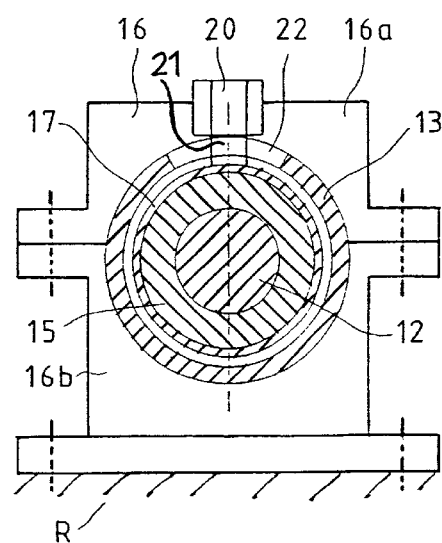
FIG. 3 is a schematic crosswise cross-sectional view of the end face area of the roll shown in FIG. 2.

FIG. 3 is a schematic cross-sectional view of the roll end face shown in FIG. 2. The figure shows the axle journal 12, the outer bearing 15, the supporting ring 17, the supporting element 13, the nut 20, the pin 21 and the mounting flange 16. The mounting flange 16 consists of two halves 16a, 16b, which can be attached to each other. The lower half 16b of the mounting flange 16 is mounted to the machine frame structures R.

Figure 4:
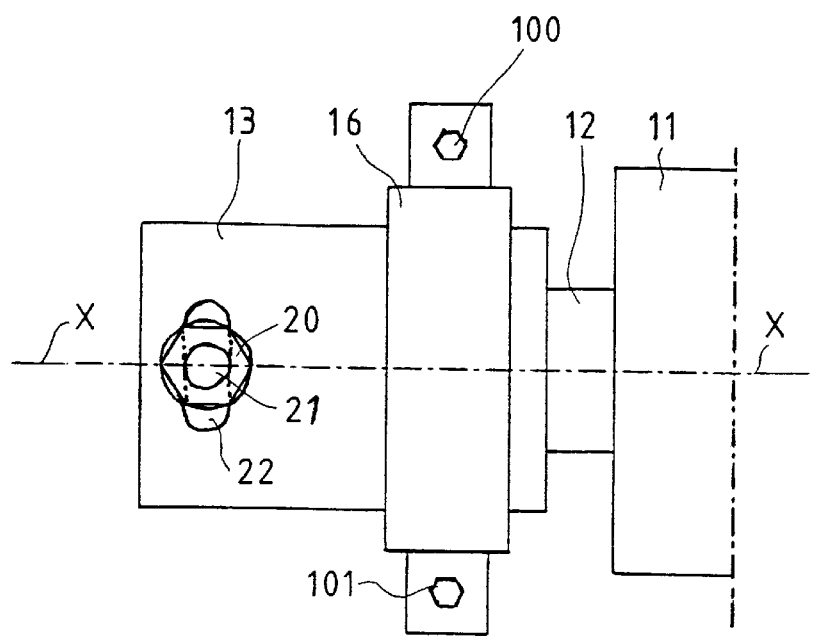
FIG. 4 is a schematic view from above of the end face area of the roll shown in FIG. 2.

FIG. 4 is a schematic view from above of the roll end face shown in FIG. 2. The nut 20 is supported on the outer surface of the supporting element 13 and the pin 21 is supported in the axial direction in a slot 22 formed in the supporting element 13, so that the pin 21 can be moved in the said slot 22 in the peripheral direction of the supporting element 13. The figure also shows mounting screws 100, 101 between the two halves 16a, 16b of the mounting flange 16.

The angular position of the longitudinal axis of the pin 21 determines the angular position of the curvature of the shell 11. In the situation shown in FIG. 3, wherein the angular position of the pin 21 is 0°, the shell 11 bends directly downwards, when the axle journal 12 is pulled by the pin 21 and by the nut 20 upwards, whereby the angular position of the curvature of the shell 11 is also 0°. In a standstill situation, the angular position of the curvature of the shell 11 may be regulated in such a way that the mounting screws 100, 101 between the two halves 16a, 16b of the mounting flange 16 are loosened, whereby the supporting element 13 can be turned in the peripheral direction, so that the longitudinal axis of the pin 21 is placed in the desired angular position. This regulation may be used for performing a rough control of the angular position of the curvature of the shell 11. Fine control of the angular position of the curvature of the shell 11 is performed by loosening the nut 20 and moving the pin 21 in the slot 22 in such a way that the longitudinal axis of the pin 21 is placed exactly in the desired angular position.

The nut 20 may also be locked to the supporting element 13 in the radial direction. Hereby the outer bearing 15 may be deflected in opposite directions in the direction of the longitudinal axis of the pin 21. When in the situation shown in FIG. 3 the nut 20 is used to push the outer bearing 15 downwards, the roll shell 11 will bend upwards, and when the nut 20 is used to pull the outer bearing 15 upwards, the roll shell 11 will bend downwards.

Figure 5:
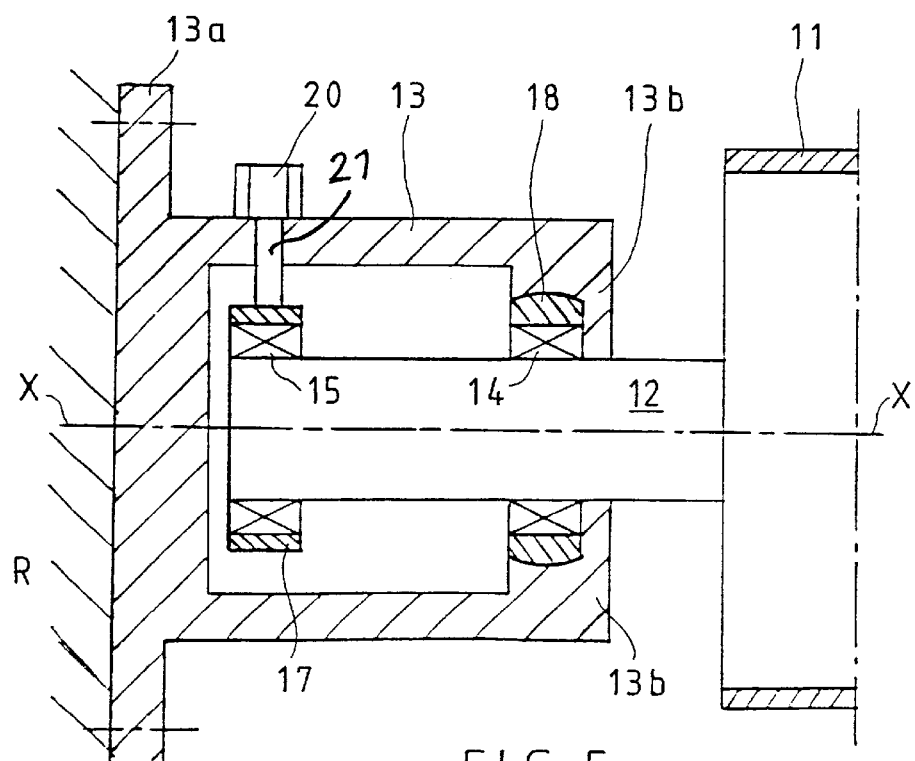
FIG. 5 is a schematic view of a modification of the embodiment shown in FIG. 2.

FIG. 5 shows a modification of the embodiment shown in FIG. 2. The outer end face of the supporting element 13 is closed by an outer end face wall 13a outside the axle journal 12, as in the embodiment shown in FIG. 2. However, in this embodiment the outer end face wall 13a extends outside the outer periphery of the tubular part of the supporting element 13, whereby the supporting element 13 can be mounted at its outer end face wall 13a to the machine frame structures R. At the inner end face of the supporting element 13 there is an inner end face wall 13b, which has an opening in size equal to the cross-section of axle journal 12 and which can be sealed to the axle journal 12. An inner bearing 14 and a pivot bearing 18 surrounding the former are also fitted to this inner end face wall 13b. The inner space of the supporting element 13 is also closed here. Pivot bearing 18 here functions as the pivot point, when the outer bearing 15 is deflected in relation to the central axis X—X of the unbent roll. In the same way as in the embodiment shown in FIG. 2, instead of two concentric superimposed bearings 14, 18 one bearing may be used, which functions both as rotatory bearing and as pivot bearing.

In the embodiments shown in the figures, the outer bearing 15 is deflected in relation to the end face of roll shell 11, whereby the inner bearing 14 functions as the pivot point. Of course, the situation may be the other way round, whereby the deflecting mechanism 20, 21 is located at the location of the inner bearing 14 and the outer bearing 15 will function as the pivot point. In the embodiment shown in FIG. 2, the mounting flange 16 is hereby located in connection with the outer bearing 15.

Instead of the pin 21 and the nut 20 shown in the figures, e.g. a wedge element may be used as the deflecting part. Hereby the wedge element is positioned into the space between bearing 14, 15, which will be deflected, and the supporting element 13. By moving the two wedge components of the wedge element in the axial direction in relation to each other a force in the radial direction can be applied to the bearing 14, 15 which will be deflected, whereby the pivot point is formed in connection with the other bearing 14, 15.

Instead of the pin 21 and the nut 20 shown in the figures, e.g. a hydraulic cylinder-piston actuator may be used as the deflecting element. The cylinder is mounted in the radial direction to the supporting element 13 and the piston rod is mounted to the bearing 14, 15, which will be deflected.

In the embodiment shown in FIG. 2, the pivot point, that is, bearing 14, is supported directly on the supporting element 13 and the supporting element 13 again is supported on the machine frame structures R by a flange 16 supporting the supporting element 13 at the bearing 14. The pivot point and the supporting point are thus in the same radial plane in the axial direction X—X. The forces applying to the deflection point are transferred through the supporting element 13 to the supporting point, and from the supporting point the forces are transferred through the flange 16 to the machine frame structures R. Thus, a bending moment is applied to the mounting point between the flange 16 and the machine frame structure R. A supporting point is formed here through the flange 16 between the supporting element 13 and the machine frame structure R.

In the embodiment shown in FIG. 5, the pivot point, that is, pivot bearing 18, is supported on a supporting element 13, which for its part is supported on the machine frame structures R outside the axle journal 12. The pivot point is here in the radial plane located at the inner bearing 14, and the supporting point is in the radial plane located outside the axle journal 12. The forces applying to the pivot point are transferred through the supporting element 13 to the supporting point as are the forces applying to the deflection point. A bending moment is applied also here to the mounting point between the supporting element 14 and the machine frame structure R. The supporting point between the supporting element 13 and the machine frame structure R is formed here through the outer end face wall 13a of supporting element 13.

The following is a presentation of claims, which define the inventive idea, within the scope of which the details of the invention may vary from the above presentation, which was given by way of example only.

We claim:

1. A bendable roll assembly comprising:
   a machine frame;
   a continuous tubular roll shell of a composite material, the roll shell defining a roll axis;
   a first axle journal connected at a first end of the roll shell, and a second axle journal connected at a second end of the roll shell to rotate together with the roll shell;
   a supporting element having an inner face and an outer face, said supporting element being fixed to the machine frame and surrounding the first axle journal;
   a first bearing element having an inner race and an outer race, the inner race being supported on the first axle journal;
   a ring encircling the first axle journal, said ring being supported on the first bearing element outer race;
   a second bearing element being spaced axially from the first bearing element and having an inner race and an outer race, the inner race being supported on the first axle journal, and the outer race being supported on the inner face of the supporting element; and
   a bending mechanism extending between the supporting element and the ring the bending mechanism comprising portions of the supporting element which define an opening surrounded by the outer face of the supporting element, and a pin mounted to the ring, the pin extending through the opening in the supporting element, the position of the pin being adjustable with respect to the supporting element to displace in a radial direction the first bearing element, to bend the axle journal in relation to the second bearing element to apply a bending moment to the roll shell.

2. The bendable roll assembly of claim 1, wherein the supporting element is mounted to the machine frame at one supporting point.

3. The bendable roll assembly of claim 1, wherein the first bearing element is spaced axially outwardly from the second bearing element.

4. The bendable roll assembly of claim 3, wherein the supporting element is mounted to the machine frame by a mounting flange positioned at the axial position of the second bearing element.

5. The bendable roll assembly of claim 1, wherein the first bearing element is spaced axially inwardly from the second bearing element.

6. The bendable roll assembly of claim 5 wherein the supporting element is mounted to the machine frame by a mounting flange positioned at the axial position of the second bearing element.

7. The bendable roll assembly of claim 1 wherein the supporting element is closed by an outer end face wall located in the axial direction at a distance from an outer end face of the first axle journal.

8. The bendable roll assembly of claim 1, wherein an inner end face of the supporting element is closed by an inner end face wall sealingly fitted on the first axle journal.

9. The bendable roll assembly of claim 1, wherein the supporting element has an end face wall positioned axially outwardly of the first axle journal, and the supporting element outer end face wall is mounted to the machine frame.

10. The bendable roll assembly of claim 9, wherein the supporting element has an inner end face wall through which the first journal extends, and wherein one of the two bearing elements is surrounded by a pivot bearing which is supported on the inner end face wall, and that the other bearing element is deflected by a bending mechanism fitted into the supporting element at the other bearing element.

11. The bendable roll assembly of claim 9, wherein the first bearing element is positioned axially inwardly of the second bearing element, and wherein the second bearing element is surrounded by a pivot bearing, which is supported on the supporting element, and the first bearing element is deflected by the bending mechanism which is fitted into the supporting element at the first bearing element.

12. A bendable roll assembly comprising:
    a machine frame;
    a continuous tubular roll shell of a composite material, the roll shell defining a roll axis;
    a first axle journal connected at a first end of the roll shell, and a second axle journal connected at a second end of the roll shell to rotate together with the roll shell;
    a supporting element having an inner face and an outer face, said supporting element being fixed to the machine frame and surrounding the first axle journal;
    a first bearing element having an inner race and an outer race, the inner race being supported on the first axle journal;
    a second bearing element being spaced axially from the first bearing element and having an inner race and an outer race, the inner race being supported on the first axle journal, and the outer race being supported on the inner face of the supporting element; and
    a bending mechanism extending between the supporting element and the outer race of the first bearing element, the bending mechanism being adjustable to displace in a radial direction the first bearing element, to bend the axle journal in relation to the second bearing element to apply a bending moment to the roll shell wherein the bending mechanism comprises:
    portions of the supporting element which define an opening surrounded by the outer face of the supporting element;
    a threaded pin mounted to a supporting ring which surrounds the first bearing element, the pin extending through the opening; and
    a nut which is fitted on to the threaded pin and which is supported against the outer face of the supporting element.

13. The bendable roll assembly of claim 12, wherein the opening is shaped as a slot, whereby the pin can be moved in a peripheral direction of the supporting element in order to change the angular position of the pin and thus change the angular position of the curvature of the shell.

14. A bendable roll assembly comprising:
    a machine frame;
    a continuous tubular roll shell of a composite material, the roll shell defining a roll axis;
    a first axle journal connected at a first end of the roll shell, and a second axle journal connected at a second end of the roll shell to rotate together with the roll shell;

a first supporting element having an inner face and an outer face, said first supporting element being fixed to the machine frame and surrounding the first axle journal;

a second supporting element having an inner face and an outer face, said second supporting element being fixed to the machine frame and surrounding the second axle journal;

a first bearing element having an inner race and an outer race and a second bearing element having an inner race and an outer race, the inner races of said bearing elements being supported on the first axle journal, and the outer race of the second bearing element being supported on the inner face of the first supporting element, wherein the first bearing element is spaced axially from the second bearing element, wherein the first bearing element is mounted to the first supporting element by a ring which surrounds the first bearing element and which has a pin which extends through an opening in the first supporting element, the position of the pin being adjustable with respect to the first supporting element to displace in a radial direction the first bearing element, to bend the first axle journal in relation to the second bearing element to apply a bending moment to the roll shell; and a third bearing element having an inner race and an outer race and a fourth bearing element having an inner race and an outer race, the inner races of said bearing elements being supported on the second axle journal and the outer race of the fourth bearing element being supported on the inner face of the second supporting element, wherein the third bearing element is spaced axially from the fourth bearing element, wherein the third bearing element is mounted to the second supporting element by a ring which surrounds the third bearing element and which has a pin which extends through an opening in the second supporting element, the position of the pin being adjustable with respect to the second supporting element to displace in a radial direction the third bearing element, to bend the second axle journal in relation to the fourth bearing element to apply a bending moment to the roll shell.

* * * * *